United States Patent [19]

Okada

[11] 4,186,089
[45] Jan. 29, 1980

[54] METHOD AND APPARATUS FOR DEWATERING OF SLUDGY SUBSTANCE

[75] Inventor: Hiroo Okada, Sagamihara, Japan

[73] Assignee: Kurita Water Industries Limited, Osaka, Japan

[21] Appl. No.: 905,939

[22] Filed: May 15, 1978

[30] Foreign Application Priority Data

May 16, 1977 [JP] Japan .................................. 52/55272
May 16, 1977 [JP] Japan .................................. 52/55273

[51] Int. Cl.² .............................................. C02B 1/20
[52] U.S. Cl. ........................................ 210/49; 210/77; 210/203; 210/216; 210/398
[58] Field of Search ................... 210/42 R, 49, 52, 53, 210/54 R, 54 A, 54 C, 77, 203, 206, 216, 332, 333 R, 333 A, 324, 330, 340, 341, 398, 488

[56] References Cited

U.S. PATENT DOCUMENTS

| 1,685,118 | 9/1928 | Campbell | 210/216 |
| 3,171,802 | 3/1965 | Rice | 210/203 |
| 3,326,381 | 6/1967 | Fuller | 210/340 |
| 3,477,575 | 11/1969 | Nemec | 210/77 |
| 3,666,107 | 5/1972 | Boggs et al. | 210/448 |
| 4,115,274 | 9/1978 | Boddeker | 210/488 |
| 4,120,911 | 10/1978 | Davidson | 210/77 |

FOREIGN PATENT DOCUMENTS

| 2452524 | 5/1976 | Fed. Rep. of Germany | 210/330 |
| 2712773 | 10/1977 | Fed. Rep. of Germany | 210/330 |
| 49-28967 | 3/1974 | Japan . | |
| 425976 | 6/1933 | United Kingdom | 210/42 R |

OTHER PUBLICATIONS

Rough Draft Translation of Japanese Kokai Patent Publication No. 49-28967.

Primary Examiner—Robert H. Spitzer
Assistant Examiner—Ernest G. Therkorn
Attorney, Agent, or Firm—Oblon, Fisher, Spivak, McClelland & Maier

[57] ABSTRACT

Within a chamber having an inlet for admitting a sludgy substance for dewatering and an outlet for discharging the dewatered cake of the sludgy substance, there are disposed two laterally opposed filtration trains each consisting of a plurality of rotary filter elements which are each formed of a multiplicity of circular plates arranged face to face in the axial direction at fixed intervals and which are so disposed that they intermesh so as to permit the circular plates of each rotary filter element to partially enter the corresponding spaces between the circular plates of the adjacent rotary filter elements. The two trains of rotary filter elements are disposed opposite each other so that when a sludgy substance is introduced through the inlet and is then caused to advance through the passage intervening between the two opposed trains of rotary filter elements toward the outlet, it is gradually freed from the water component by virtue of the spaces formed in the enmeshed portions of the multiplicity of circular plates of the rotary filter elements arranged as described above, with the result that the dewatered cake of the sludgy substance is concentrated to a gradually higher degree.

8 Claims, 6 Drawing Figures

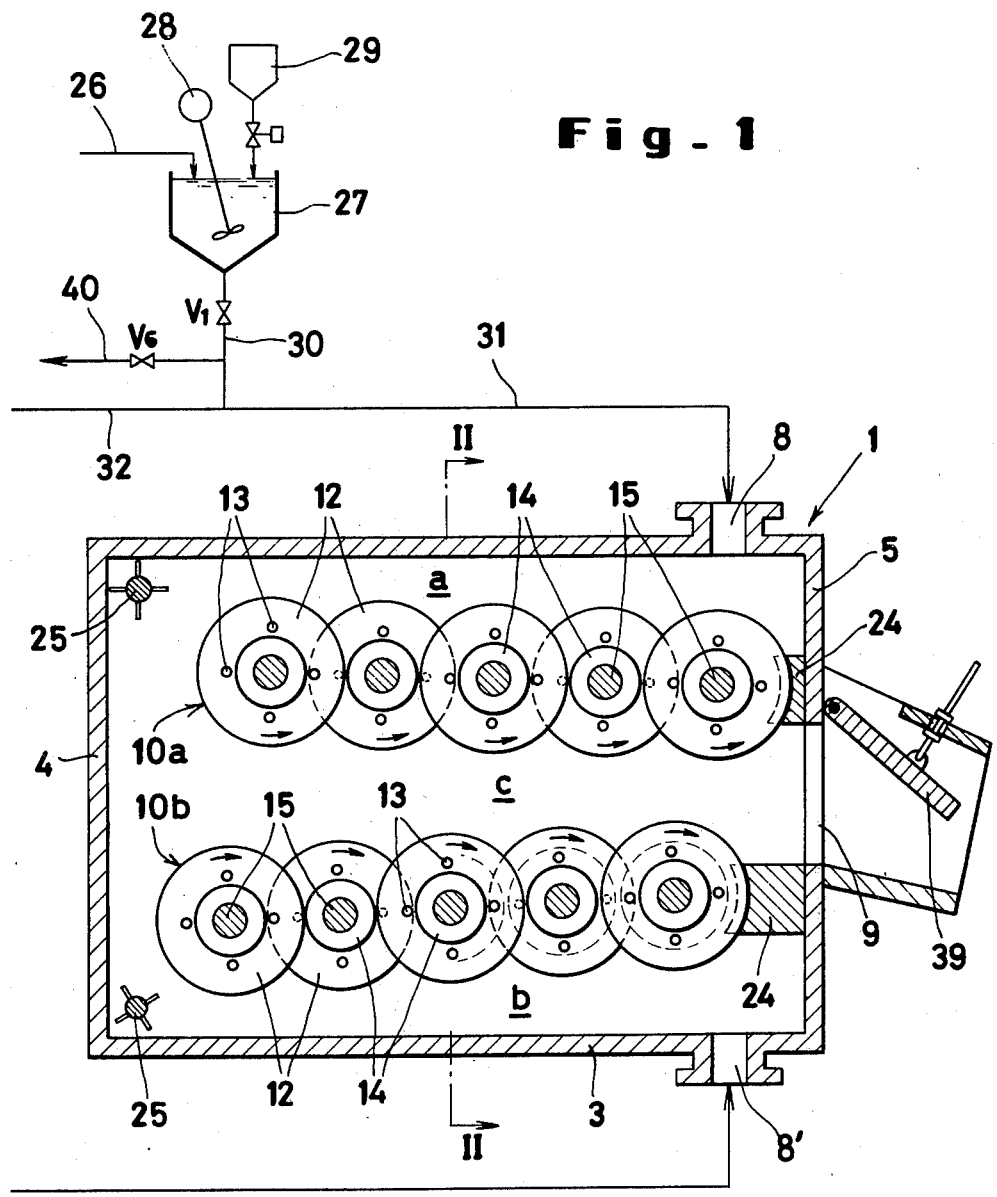
Fig_1

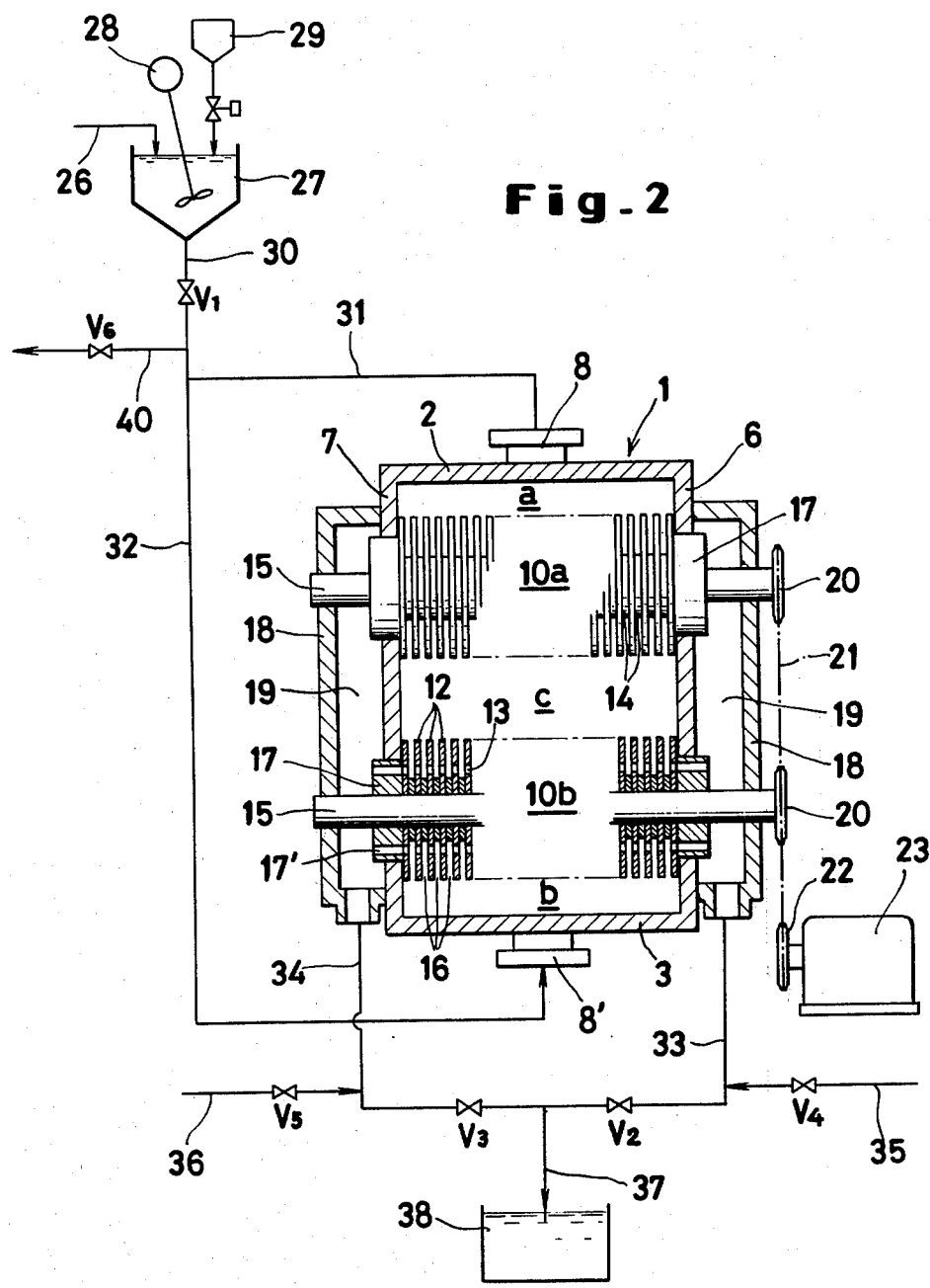
Fig_2

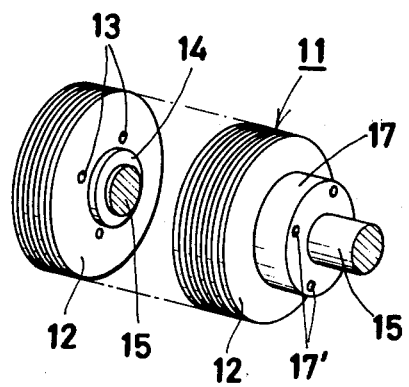
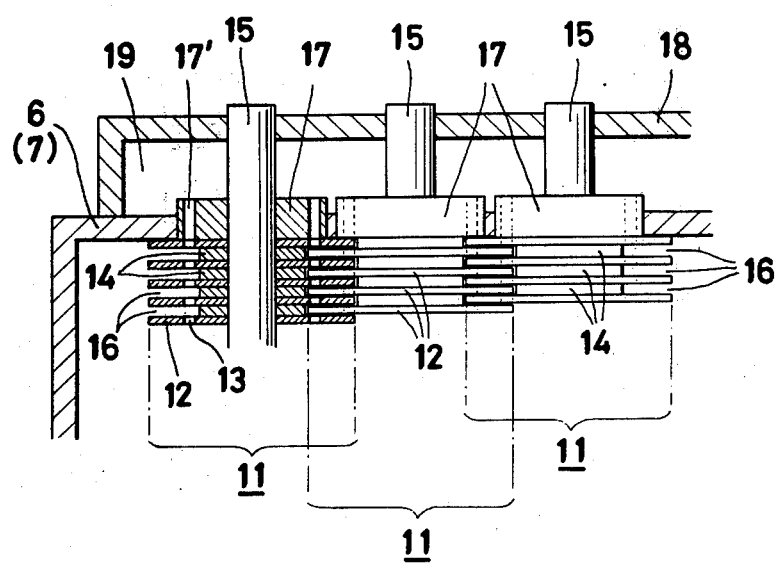

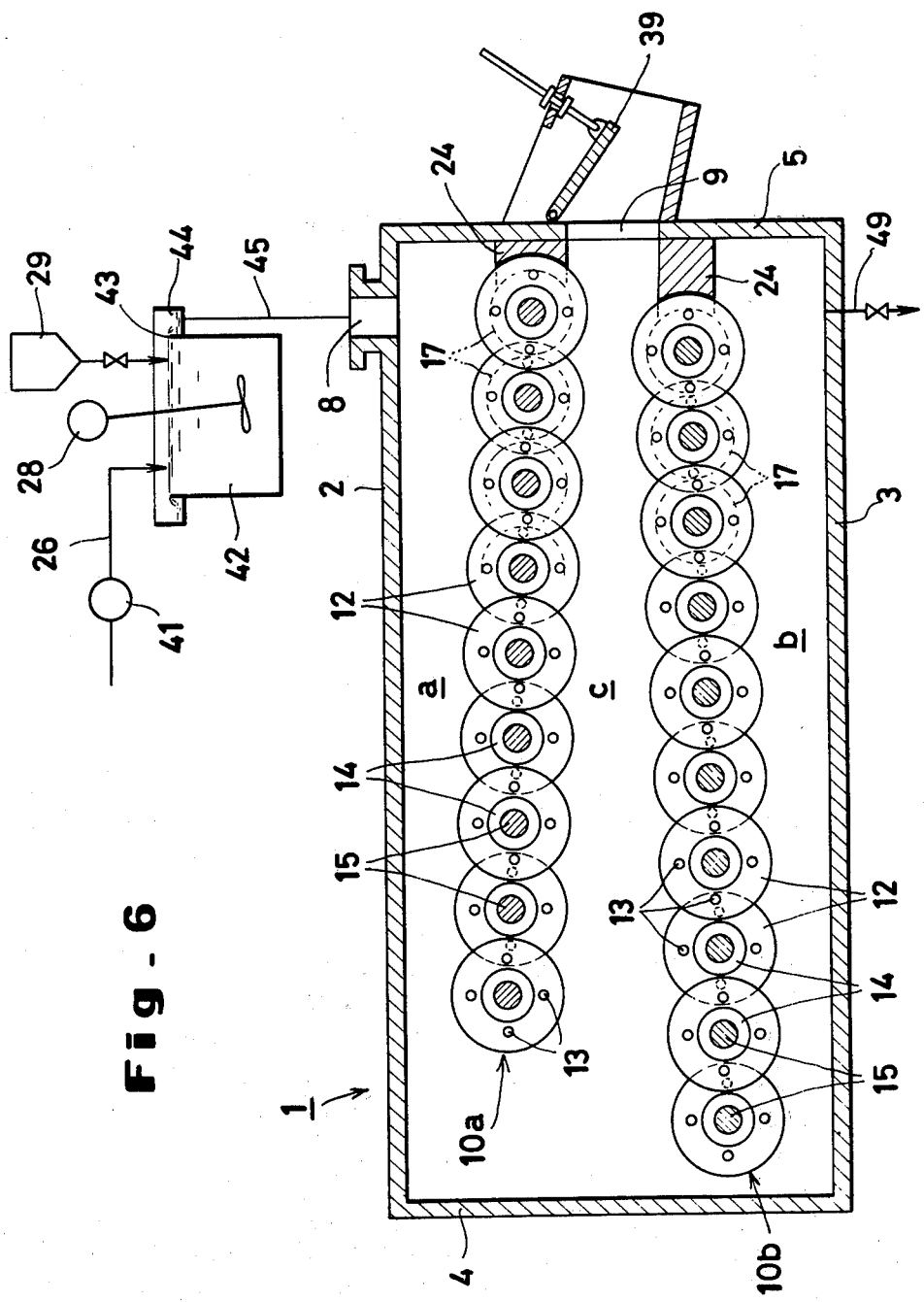

METHOD AND APPARATUS FOR DEWATERING OF SLUDGY SUBSTANCE

BACKGROUND OF THE INVENTION

1. Field of the Invention

This invention relates to a method and apparatus for treating a sludgy substance, namely a liquid containing therein suspended solids, for thereby separating from the liquid the suspended solids in a concentrated dewatered state. More particularly, this invention relates to a method and apparatus for separating suspended solids in a concentrated, dewatered state from a liquid, therein organic or inorganic suspended solids such as activated sludge, excess sludge and sedimented sludge originating in water and wastewater treatment facilities, and which can also be used for recovering proteins from the effluent which issue from food processing plants specializing in the production of fish meat pastes or for separating squeezed juice from fruit pulp in plants specializing in the production of fruit juice.

2. Description of the Prior Art

For the treatment of solids-containing liquids aimed at separating the solids in a concentrated, dewatered state as described above, there have heretofore been adopted various devices including filter presses, traveling filter cloth type dehydraters and vacuum filters. All the devices known in the art have invariably used filter cloths for the purpose of solid-liquid separation. Filter cloths have a disadvantage in that they clog when used continuously and consequently become degraded in their treating ability. They are also apt to break easily while in use.

Japanese Patent Public Disclosure No. 28967/1974 discloses a continuous exuding device which comprises two laterally opposed trains each consisting of a plurality of rotary filter elements which are each formed of a multiplicity of circular plates arranged face to face in the axial direction at fixed intervals and which are so disposed that they intermesh so as to permit the circular plates of each rotary filter element partially to enter the corresponding spaces between the circular plates of the immediately adjacent rotary filter element, which apparatus is operated by causing a sludgy substance to be fed under pressure into the passage intervening between the trains of rotary filter elements for thereby allowing the substance to be exuded by the opposed trains approaching each other in the direction from the inlet to the outlet and, at the same time, to be conveyed toward the outlet by the individual rotary filter elements being rotated around their shafts. This exuding device, however, exhibits insufficient treating ability when used on a feed liquid such as slurry containing much water because the water component separated from the solid component is discharged only through the portions in which the circular plates of one rotary filter element partly enter the spaces intervening between the circular plates of the immediately adjacent rotary filter element.

Generally this device has insufficient treating ability because the liquid under treatment is allowed to come into contact with only half of the surfaces of the rotary filter elements, namely only half of the whole portions of the rotary filter elements take part in the filtration of the liquid under treatment. This device has another disadvantage that it fails to produce a sufficiently dehydrated cake because the rotary filter elements in each train are so arranged as to be rotated at circumferential speeds gradually increasing with the decreasing distances of the relevant rotary filter elements from the outlet.

An object of the present invention is to provide a method and apparatus capable of effectively dewatering a sludgy substance without requiring use of easily clogging materials such as filter cloths.

Another object of the present invention is to provide a method and apparatus for dewatering a sludgy substance, which permits efficient separation of a sludgy substance into clear liquid and a cake containing filter water.

SUMMARY OF THE INVENTION

To accomplish the objects described above according to this invention, there is provided an apparatus for dewatering a sludgy substance, which apparatus comprises a chamber provided with one or more inlets in the upper and/or lower walls thereof for admitting a sludgy substance for dewatering and with an outlet in a vertical wall thereof for discharging the dewatered cake of the sludgy substance, two filtration trains each composed of a plurality of filter elements and disposed within the chamber to face each across an intervening passage one end of which communicates with the outlet, the plurality of filter elements in each train being respectively formed of a multiplicity of thin plates having a plurality of orifices and arranged face to face in the axial direction at fixed intervals so that the orifices align to form paths for the filtrate and being collectively disposed so that they intermesh to permit the plates of each filter element to partially enter the corresponding spaces between the plates of the adjacent filter elements, means for communicating the filtrate orifices of each of the plates at one end of the filter elements with the exterior of the chamber, and means for rotating the plurality of filter elements so that the edges of the plates facing the intervening passage move toward the outlet. While the substance fed through the inlet into the chamber is brought into contact with the opposed faces of the trains of rotary filter elements and conveyed through the passage, the water component of the substance is exuded and drawn away through the spaces formed between the plates. The rotating speeds of the rotary filter elements are gradually decreased in the direction of the outlet roughly in proportion to the decrease in the volume of the substance under treatment as it becomes substantially dewatered by the time it reaches the filter elements close to the outlet. In the last portion of the passage, the substance is exuded with gradually higher pressure and freed further from the water component. Finally, the substance is discharged as a cake in a highly concentrated, dehydrated state via the outlet. The dewatering of the sludgy substance by this apparatus can be more efficiently carried out by adding to the substance a coagulant which serves to flocculate the suspended solids contained in the substance.

The other objects and the other characteristics of this invention will become apparent from the detailed description to be given herein below with reference to the accompanying drawings.

BRIEF EXPLANATION OF THE DRAWING

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 1 is a sectional view of one embodiment of the apparatus of the present invention for dewatering a sludgy substance.

FIG. 2 is a sectional view taken along the line II—II of the apparatus of FIG. 1.

FIG. 3 is a perspective view of a filter element used in the construction of the apparatus of FIG. 1.

FIG. 4 is a partially enlarged view illustrating a plurality of filter elements of FIG. 3 in an intermeshed state.

FIG. 6 is a sectional view of another embodiment of the apparatus of the present invention.

DESCRIPTION OF THE PREFERRED EMBODIMENTS

Figure 5:
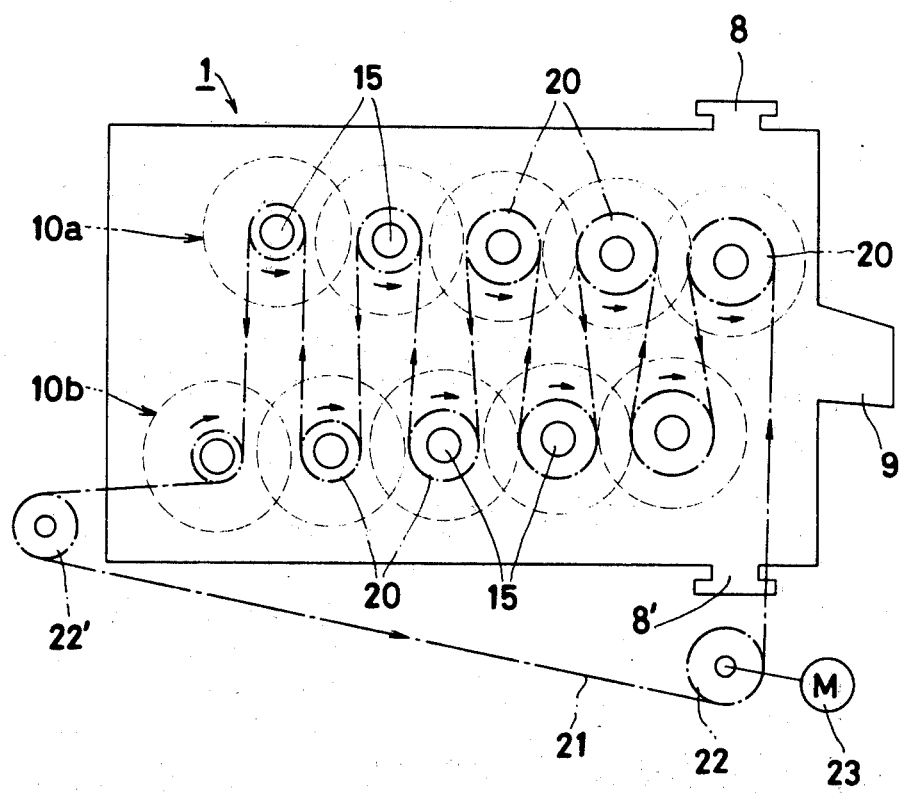
FIG. 5 is an explanatory diagram illustrating the condition in which the filter elements of the apparatus of FIG. 1 are in a rotary motion.

A first embodiment of the apparatus of this invention for dewatering a sludgy substance will be described with reference to FIG. 1 through FIG. 5. In the apparatus for dewatering illustrated in the drawing, a chamber 1 is composed of an upper wall 2, a bottom wall 3, a front vertical wall 4, a rear vertical wall 5 and vertical side walls 6, 7 and it outwardly assumes the shape of a substantially rectangular parallelepiped box. The chamber 1 is provided with an inlet 8 in the upper wall 2 thereof for admitting a feed liquid for dewatering and an outlet 9 in the rear vertical wall 5 thereof. The chamber 1 may also be provided with an inlet 8' in the bottom wall 3 thereof for the same purpose, if necessary. Although in FIGS. 1 and 5 two inlets are shown to be provided one each in the upper wall 2 and the bottom wall 3, the inlet in the bottom wall may be omitted when desired. The inlets for the admission of the feed substance are best formed in the chamber in the portions of the upper wall 2 and the bottom wall 3 as close to the rear vertical wall 5 as possible in order that the distance over which the dehydration of the substance by filtration trains described hereafter may be elongated as much as possible. Inside the chamber 1, two filtration trains 10a, 10b each formed of a plurality of filter elements 11 individually possessing the overall appearance of a cylinder are vertically opposed to each other across a passage one end of which communicates with the outlet 9. The filter elements 11 of the opposed filtration trains 10a, 10b are rotatably supported in position on the opposite vertical side walls 6, 7.

Each filter element 11 is formed by alternately arranging on a shaft 15 plates 12 made of stainless steel for example and possessed of a plurality of filtrate discharge orifices 13 and annular spacers 14 possessed of a slightly greater thickness and a much smaller diameter than the circular plates 12. The plates have a thickness which is suitably selected in the range of from 0.1 to 2 mm in accordance with the particular kind of solids suspended in the sludgy substance to be treated. If the suspended solids in the substance are large, strong flocks, for example, the circular plates must be given a fairly large thickness in order for them to acquire a sufficient degree of mechanical strength. Generally speaking, for a fixed length of the shafts 15 used in the apparatus, the effect of the solid-liquid separation obtained by capillary action is enhanced in proportion as the thickness of the individual plates decreases and the number of intervening spaces among the plates and the annular spacers is increased. If the thickness of the plates exceeds 2 mm, the intervening spaces will naturally have a thickness greater than that of the plates and these large intervening spaces tend to allow solids to remain in the filtrate being passed therethrough. Thus, a thicknesses over the upper limit of 2 mm proves undesirable. The area of treatment of course increases with the increasing diameter of the individual plates. Such plates can be efficiently manufactured by pressing suitable materials and in due consideration of significant factors such as the ease of fabrication and the miniaturization of the chamber. It is practically advantageous to select the diameter in the range of from 50 to 300 mm. The filtrate discharge orifices 13 which are formed in each plates 12 must be formed outside the circumference of the annular spacers 14. The diameter of each filtrate discharge orifice 13 should be selected in due consideration of the diameter of the circular plate, the diameter of the annular spacer 14 and the composition of the substance under treatment. Generally, the diameter of such orifices is selected in the range of from 5 to 30 mm. The number of such orifices in each plate is also suitably selected by taking into due consideration the various factors mentioned above. Four orifices are shown in the present preferred embodiment. The spacers are made of suitable materials such as stainless steel plate having a thickness greater than that of the plates by from 0.1 to 0.5 mm.

As the plates 12 and the annular spacers 14 are alternately arranged to complete a filter element 11, there are produced intervening spaces 16 of the shape of flat doughnuts around the annular spacers 14. The filtrate discharge orifices 13 in each of plates 12 are formed to register with one another when the plates are arranged face to face and fastened on the shaft 15. As a result, the filtrate discharge orifices in the circular plates form straight continuous paths extending through the multiplicity of intervening spaces 16 parallelly to the shaft.

Each filter element 11 is rotatably supported in the vertical side walls 6, 7 by two rings 17 which have a greater thickness than that of the vertical side walls 6, 7 and are fixed on the shaft 15 one each in direct contact with each outermost plates. In order for the filtrate flowing through the continuous paths to be released out of the chamber, these rings 17 contain similar filtrate orifices 17' at positions corresponding to those of the filtrate discharge orifices 13 in the assembled plates.

To the vertical side walls 6, 7 of the chamber 1, there are attached collector boxes 18 serving to receive the filtrate flowing out of the filtrate discharge orifices 17' formed in the rings 17. These boxes form filtrate receptacles 19. Consequently, each filter element 11 is rotatably supported by such rings 17 in the vertical side walls 6, 7 and through the shaft 15 by the collector boxes 18. The bearings involved herein are formed water-tightly by use of O-rings (not shown), for example.

The individual rotary filter elements 11 arranged side-by-side in the two filtration trains 10a, 10b which are vertically opposed to each other are disposed so that the outer edges of the plates 12 in each rotary filter element 11 will partly enter the corresponding spaces 16 defined by the plates and the annular spacers of the immediately adjacent rotary filter element as illustrated in FIG. 4.

The plates of the filter elements are enmeshed with each other so that the outer edges of one element at least reach the rotary locus of the filtrate discharge orifices of the intervening spaces of the immediately adjacent filter element, in order to prevent possible clogging of the filtrate discharge orifices 13. That is, the inserted edges reach at least the nearest one of the filtrate discharging orifices. Preferably the plates of one filter element completely cover the nearest one of the filtrate discharge orifices of the immediately adjacent filter element to more adequately prevent clogging thereof. With a view to ensuring smooth conveyance of the sludgy substance during treatment, it is desirable to adjust the positions of the two vertically opposed filtration trains 10a, 10b in such a way that the intervening passage "c" formed between the two trains will gradually decreases in width in the direction of the outlet 9 and to dispose the two filtration trains in such a way that the individual rotary filter elements 11 in one filtration train are displaced from the corresponding filter elements 11 in the other filtration train by a distance corresponding to the radius of the circular plates. The distance between the two opposed filtration trains is in the range of from 5 to 50 mm, preferably from 10 to 20 mm.

The portions of the shafts 15 of each filter elements 11 protruded from the collector box 18 at one end have sprockets 20 fixed thereto for the purpose of imparting rotational motion to the rotary filter elements. A typical element of the mechanism to be used for rotationally driving the rotary filter elements as shown in FIG. 5. As is clear from the illustration, an endless chain 21 which is meshed with a driving sprocket 22 operated by a driving source 23 such as a motor is engaged first with the sprocket fixed on the first filter element (counting from the end nearest the outlet 9) in the upper filtration train 10a, then with the sprocket fixed on the first filter element in the lower filtration train 10b, subsequently with the sprocket fixed on the second filter element in the upper filtration train 10a, thereafter with the sprocket fixed on the second filter element in the lower filtration train 10b, and so on. In this manner, the endless chain 21 is passed in a zigzag pattern around the filter elements of the upper filtration train 10a and those of the lower filtration train 10b alternately. After completing its enmeshment with the sprockets of all the filter elements, the endless chain 21 is passed around an auxiliary sprocket 22' and finally brought back to the driving sprocket 22. The individual filter elements 11 of the upper filtration train 10a and those of the lower filtration train 10b, therefore, are rotated in directions which are contrary to each other but which both convey toward the outlet. Practically, the circumferential speeds of these rotary filter elements are suitably selected in the range of from 15 to 1000 mm/min, depending on the particular kind of the substance under treatment. The circumferential speeds may be increased where the solids suspended in the substance form large and strong flocks. Desired solid-liquid separation of the substance can be carried out more adequately and efficiently by preparatorily adding a coagulant or flocculation agent (hereinafter referred to totally as "coagulant") to the substance for thereby giving rise to flocks therein and thereafter subjecting the substance to dehydration by the apparatus of this invention.

Sealing members 24 are inserted one each between the rear vertical wall 5 and the rotary filter elements of the two, i.e. one upper and one lower, filtration trains 10a, 10b which are located most closely to the outlet 9. These sealing members 24 are provided with teeth at the side of the filter elements and they are enmeshed with the plates of filter elements so that their ridges partially enter the spaces 16 formed by the spacers 14 and the plate 12.

In the corner formed by the upper wall 2 and the front vertical wall 4 and the corner formed by the bottom wall 3 and the front vertical wall 4 inside the chamber 1, means 25 for preventing stagnation formed of a plurality of blades attached to a rotary shaft are disposed at positions where they do not interfere with the rotary motion of the rotary filter elements 11. The rotary shafts of these means 25 for preventing stagnation are rotatably supported in the vertical side walls 6, 7. Sprockets are fixed on these rotary shafts similar to those on the shafts of rotary filter elements, though these are not illustrated. By the chain 21 which is enmeshed with these sprockets, the means 25 for preventing stagnation are rotated in directions contrary to the directions in which the nearest rotary filter elements are rotated, as illustrated. For the purpose of preventing stagnation of the substance at the respective corners inside the chamber 1, these means are desired to be rotated at speeds at least equal to or preferably greater than those of the rotary filter elements.

In the apparatus of the foregoing structure designed for the dehydration treatment of a sludgy substance, the substance subjected to the treatment is introduced through a feed pipe 26 into a mixing tank 27, in which it is mixed by means of a stirrer 28 with a coagulant delivered separately from a coagulant storage tank 29. By virtue of the difference of head between the mixing tank 27 and the chamber 1, the substance which has been mixed with the coagulant within the mixing tank 27 is forced out through a pipe 30 incorporating a valve $V_1$, forwarded via pipes 31, 32 and introduced into the chamber 1 via the inlets 8, 8' contained respectively in the upper wall 2 and the bottom wall 3. The portion of the feed substance admitted through the upper inlet 8 is caused to advance in a passage "a" defined by the upper surface of the upper filtration train 10a and the inner surface of the upper wall 2 of the chamber 1 toward the front vertical wall 4, by the rotation of the filter elements of the upper filtration train 10a coupled with the pressure of delivery. Similarly, the portion of the feed substance admitted through the bottom inlet 8' is caused to advance in a passage "b" defined by the lower surface of the lower filtration train 10b and the upper surface of the bottom wall 3 of the chamber 1 toward the front vertical wall 4, by the rotation of the filter elements of the lower filtration train 10b coupled with the pressure of delivery. When the portions of the substance advanced as described above reach the front vertical wall 4, one stream of the substance which has traveled through the passage "a" changes its course downwardly and the other stream which has traveled through the passage "b" changes its course upwardly by virtue of the rotation of the leftmost rotary filter elements of the upper and lower filtration trains 10a, 10b coupled with the pressure of delivery (FIG. 1). As the two streams meet and mix with each other, the combined stream is now caused to advance in the direction of the outlet 9 in the intervening passage "c" defined by the inner surfaces of the upper and lower filtration trains. While the substance is traveling in the passages "a" and "b", it is adequately freed of the water component thereof by virtue of exudation and suction generated as described hereafter. Thus, the conveyance of the substance in the passage "c" is accomplished substantially by the friction of the substance against the outer edges of the circular plates forming the rotary filter elements of the upper and lower filtration trains 10a, 10b. Owing to the rotation of the rotary filter elements of the filter trains coupled with the pressure of delivery, the passages "a" and "b" are always kept in a state filled to capacity with the substance. Thus, there ensues a possibility that the substance will stagnate in the corners formed in the upper and the lower portions of the front vertical wall 4. To preclude this trouble, means 25 for preventing stagnation are disposed one each in the corners aforementioned and operated to prevent the substance from being retained long in the corners. Instead of having the corners provided with such means for preventing stagnation, the chamber itself may be fabricated from the beginning in such a way as to possess smoothly rounded corners which, unlike the rectangularly bent corners, permit no part of the substance under treatment to stagnate during its flow through the aforementioned passages "a" and "b".

As described above, the substance under treatment while being conveyed within the chamber 1 is gradually freed from its water component by virtue of exudation and suction caused by the cooperation of the multiplicity of rotary filter elements. To be more specific, as the substance under treatment comes into contact with the rotary filter elements in motion, the water component thereof is caused to be exuded into the spaces intervening between the plates by virtue of the capillary action and/or the difference of pressure. The water component thus drawn into the spaces is forwarded through the filtrate discharge orifices 13 in the plates and the orifices 17' in the rings 17 and recovered in the filtrate receptacles 19. The filtrate which has collected in the filtrate receptacles 19 is drawn out via a conduit 33 incorporating a valve $V_2$ and a conduit 34 incorporating a valve $V_3$ and discharged into an externally installed filtrate reservoir 38 via a conduit 37 (FIG. 2). The conduit 37 may be of a type adapted for spontaneous discharge of the filtrate by gravity or of a type provided with a pump to permit forced discharge thereof. In the latter type, the filtrate receptacles 19 are kept in a decompressed state, so that suction of the water component from the substance will be effected more in a forced manner. The transfer of the filtrate to the filtrate reservoir 38 may otherwise be effected by use of a siphon.

As the removal of the water component from the substance under treatment proceeds as described above, the remaining substance on the elements gradually increases in concentration. Accordingly, the substance eventually comes to assume the state of a cake. As this dehydrated cake resulting from the treatment of the substance reaches the immediate vicinity of the outlet 9, it collects into a mass which practically closes the outlet. The cake thus collecting in the vicinity of the outlet 9 is gradually pushed out of the outlet by the pressure exerted from the portion of the cake subsequently reaching the vicinity as well as the rotation of the filter elements. Since the substance is gradually compressed while collecting in the vicinity of the outlet before being forced out of the outlet, the additional dehydration of the substance is effectively carried out. This dehydration of the substance is all the more enhanced by adjusting the aperture of the outlet 9 with a damper 39 disposed at the outlet 9.

Any substance can effectively be dehydrated by the apparatus of the present invention, insofar as it is in the form of slurry comprising solids suspended in a liquid. Familiar examples are sludgy substances from water and wastewater treatment of river water, sewage, industrial waste and the like, pulpy juices produced by crushing fruits at juices manufactures. The dehydration treatment by use of the apparatus of this invention can be carried out with additional efficiency when substances suspended or dissolved in a liquid are crystallized out or flocculated by adding a pH adjusting agent or a coagulant to them. Such addition of a coagulant proves particularly advantageous when a sludge issuing from a water or wastewater treatment plant is subjected to the dewatering treatment by this apparatus. In the case of an organic sludge of the type which occurs in a sewage treatment plant, for example, addition of a cationic high molecular coagulant is especially effective in the dehydration of the sludge. Any ordinary cationic high molecular coagulant can be used for this purpose. Preferred examples of such coagulants are those containing an amino group, imino group, quaternary ammonium salt group, pyridium group, or individually or in mixtures, in their polymer components such as amino-alkyl esters of acrylic acid or methacrylic acid, polymers of alkylamino-alkyl esters or quaternary derivatives thereof, polymers of Mannich-reaction product or Hoffman-decomposition product or acrylamide or quaternary derivatives thereof or polyalkylenepolyamines. In the case of an organic sludge of the type which occurs in a river water treatment plant, for example, the dehydration treatment by the apparatus of this invention can be effectively carried out by having a nonionic or an anionic high molecular coagulant added in advance to the sludge. In any case, the addition of such a coagulant selected by taking account of the composition of the substance subjected to the treatment and added to the substance prior to the dewatering treatment is aimed at increasing the size of suspended solids and further converting the solids into strong flocks. It is also possible to use two or more coagulants simultaneously or to use a coagulant in conjunction with a pH adjusting agent or other water treating agents. The amount of coagulant added to the substance to be treated is variable according to the composition of the substance, the conditions of the treatment, the kind of coagulant selected and other factors. As a standard, a proper amount of coagulant will ordinarily be in the range of from 0.1 to 2.5% based on the dry weight of the solid component of the sludgy substance.

The width of the space 16 formed between the adjacent plates 12 of each rotary filter element is slightly greater than the thickness of the individual plates and is on the order of from 0.2 to 2.5 mm. When the outer edge of the corresponding plate 12 of the immediately adjacent filter element enters this space 16, the gap remaining on either side of the inserted plate is 0.05 to 0.25 mm in width. When a coagulant is added to the substance to be treated, the solid particles are coagulated into flocks of a size too large to pass through the gaps and the spaces mentioned above. Even if the flocks have a diameter smaller than the width of the spaces, they get enhanced strength owing to the action of a coagulant and they are consequently capable of causing the phenomenon of bridging small flocks in the spaces. Thus, they cannot attain access to the filtrate discharge orifices 13.

If solid particles happen to find their way into or get caught in the spaces, regardless of whether a coagulant is added to the substance to be treated or not, they are forced out of the spaces because the plates 12 of each rotary filter element, while in rotational motion, have their outer edges always inserted into the corresponding spaces in the immediately adjacent rotary filter element to a depth enough to, at least, extend beyond the filtrate discharge orifices 13 so that their rotating outer edges keep the interiors of the spaces forcibly cleaned at all times. As a result, no clogging can occur in the spaces formed between the plates 12 of each rotary filter element 11 or in the filtrate discharge orifices 13 provided in the each of plate 12.

Since the substance is gradually freed of its water component by virtue of exudation and suction while it is being conveyed on the trains of rotary filter elements toward the outlet 9 at the terminal of the passage "c", it attains the state of a cake and decreases in volume. Further to ensure advantageous removal of the water component from the sludgy substance under treatment, it is necessary to cope with the gradual decrease in the volume of the substance by some means such as by gradually diminishing the speed of conveyance of the substance with decreasing distance of the substance from the outlet and/or having two filtration trains so disposed with each other so that the distance between the opposite surfaces of the trains will gradually decrease toward the outlet. If such means is omitted, the substance will not be sufficiently dehydrated to the state of cake and, which, will not collect into a mass which effectively closes the outlet. Consequently, the substance will depart in a still sludgy or fluid state from the outlet.

The substance can easily be prevented from leaving the outlet of the chamber in a sludgy or fluid state by controlling the speed of the conveyance of the sludgy substance under treatment on the rotating elements, namely by decreasing the circumferential speeds of the rotary filter elements of the opposed filtration trains in proportion to their decreasing distance from the outlet. In the passages "a" and "b", the substance under treatment is still in the state of slurry having a high water content and, therefore, is conveyed more by the pressure of delivery etc. than by the rotation of the filter elements. In the passage "c", the substance is affected very little by the pressure of delivery and therefore is conveyed substantially by the rotation of the filter elements. When the circumferential speeds of the rotary filter elements are, therefore, gradually diminished with decreasing distance from the outlet as described above, the retention time of the substance within this passage is lengthened, and the pressure exerted upon the substance is gradually increased, and the density of the substance is enhanced. Consequently the substance has no possibility of being discharged in a state still having a high water content.

The substance can also be prevented from being discharged in a fluid state by having the two filtration trains disposed in such a way that the distance between the opposite surfaces of these trains is gradually decreased in the direction of the outlet. If two filtration trains are disposed so as to have their opposite surfaces abruptly approach nearer together, however, there ensues the disadvantage that the shapes of the passages "a" and "b" must be modified and dimensions of the apparatus are increased consequently. By the factors described above being balanced properly, an apparatus capable of providing effective and advantageous dehydration treatment of the sludgy substance is obtained.

A typical way of decreasing the circumferential speeds of the rotary filter elements with decreasing distances from the outlet is to provide sprockets of gradually increasing diameter on the shafts 15 of the rotary filter elements 11 toward the outlet as illustrated in FIG. 5. Otherwise, the circumferential speeds of the rotary filter elements are gradually lowered and the distance between the opposite surfaces of the filtration trains is decreased by giving gradually decreased diameters to the plates of the rotary filter elements toward the outlet.

The aforementioned control of the circumferential speeds of the rotary filter elements required in coping with the decrease of water content of the substance owing to the progress of the dewatering treatment need not be considered with respect to the passages "a" and "b". This is because in the passages "a" and "b", the substance under treatment is still in a state of slurry and, therefore, can be conveyed smoothly. When two filtration trains are arranged so that the rotary filter elements of one train are displaced by a fixed distance from the corresponding rotary filter elements of the other train as illustrated in FIG. 1, the substance under treatment is, as a whole, caused to advance in a zigzag pattern. However, the middlelayer portion of the substance is allowed to advance in a substantially straight course. Consequently, the solid particles in the middlelayer portion of the substance are disarranged to the extent of inducing the phenomenon of dilatancy, with the result that the water component present among the solid particles is also removed by the rotary filter elements. Thus, the cake produced by this treatment is in a state dehydrated to a very high degree and the filtrate collected in the reservoir contains practically no solid particle and, therefore, a filtrate of high clarity is obtained.

At the time operation of the apparatus is started, the opening of the outlet 19 is closed by the damper 39. When the treatment proceeds further and, consequently, cake is collected enough to fill up the part of the passage "c" in the immediate vicinity of the oulet 9 within the chamber, the damper 39 is opened to a prescribed aperture. By the regulation of this aperture of the damper 39 in conjunction with the regulation of the circumferential speeds of the rotary filter elements, retention time of the substance within the chamber can be adjusted and, as a result, water content of cake discharged through the outlet can be controlled.

The present embodiment has been illustrated to have the inlets 8, 8' for the admission of the substance to be dewatered positioned close to the rear vertical wall 5 of the chamber. Consequently the substance while in conveyance can be maintained in effective contact with both surfaces of each of the filtration trains 10a, 10b. Thus, the area available for the filtration of the substance is twice as large as that utilized when the inlets are disposed close to the front wall 4 of the chamber. The dehydrating capacity of the apparatus' therefore, is about twice as large as that obtained when the substance is brought into contact with the upper or the lower train.

The rotary filter elements and the interior of the chamber 1 can be washed by closing the valve $V_1$ in the feed conduit 30 for the admission of the substance to be dehydrated and the valves $V_2$ and $V_3$ in the filtrate discharge conduits 33, 34 and by opening valves $V_4$ and $V_5$ incorporated in pressurized water feed conduits 35, 36 connected with the conduits 33, 34 for thereby introducing pressurized water into the interior of the chamber (FIG. 2). Consequently, pressurized water flows from the conduits 35, 36 to the spaces 16 between the plates of the rotary filter elements via the filtrate receptacles 19, and the filtrate discharge orifices 17' and 13. The spent pressurized water is then forced out through the inlets 8, 8' forwarded through conduits 31, 32 connected respectively to the inlets and finally discharged out of the system via a discharge conduit 40 which branches off from the feed conduit 30 and incorporates a valve $V_6$.

One preferred embodiment of the rotary filter element has been described as possessing a structure formed to have plates and annular spacers alternately arranged and secured to central shafts. Alternatively, a rotary filter element which is effectively usable as the apparatus of this invention can be formed an an integral body by cutting a metallic cylinder to make annular grooves of a width equalling that of the spacers of the preceding embodiment at fixed intervals in the axial direction and boring a plurality of filtrate discharge orifices in remaining the plates parallelly to the axis of the cylinder. The individual plates 12 of the rotary filter element may possess any shape such as a circular, elliptic, rectangular or square shape insofar as the projecting edges of plates in one rotary filter element are allowed to enter partly into the corresponding spaces intervening between the plates of the immediately adjacent rotary filter element to a depth sufficient for the inserted edges of the plates of one rotary filter element to slide past the filtrate discharge orifices formed in the plates of another rotary filter element.

For example, circular plates of stainless steel 96 mm in diameter and 0.1 mm in thickness and annular spacers of stainless steel 64 mm in diameter and 0.2 mm in thickness were alternately arranged and fastened up to a total thickness of 50 mm to complete a filter element 11. Seven such filter elements were so arranged to complete a filtration train wherein the circular plates of each filter element entered to a depth of 6 mm into the corresponding spaces intervening between the circular plates of the immediately adjacent filter element. Two such filtration trains were rotatably supported in such relative positions by the vertical side walls of a chamber that their opposite surfaces were inclined toward each other by an angle of 2° toward an outlet and were separated from each other by the smallest distance of 111 mm between the centers of the upper and lower circular plates at their outlet side end. On the end of each shaft of the rotary filter elements projecting from the lateral walls, a sprocket containing a fixed number of teeth was fixed. An endless chain was enmeshed between these sprockets as illustrated in FIG. 5. In the apparatus constructed as described above, activated sludge from a sewage treatment facility having a sludge concentration of from 0.770 to 0.808% (water content of 99.230 to 99.192%) was fed, with a cationic organic polymer added thereto as a coagulant. The results are shown in Table 1. For comparison, the same dewatering treatment was performed by the procedure mentioned above, but without addition of a coagulant. The results are also shown in the Table 1.

Table 1

| Amount of a coagulant added per amount of feed substance for treatment (ppm) | Rotating number of rotary filter elements (r.p.hr.) | Amount of dehydrated substance discharged (g/hr) | Weight of solids in cake (g/hr) | Water content of cake (%) | Solid content of filtrate (ppm) |
|---|---|---|---|---|---|
| 4 | 12 | 1252 | 184 | 85.3 | 855 |

Table 1-continued

| Amount of a coagulant added per amount of feed substance for treatment (ppm) | Rotating number of rotary filter elements (r.p.hr.) | Amount of dehydrated substance discharged (g/hr) | Weight of solids in cake (g/hr) | Water content of cake (%) | Solid content of filtrate (ppm) |
|---|---|---|---|---|---|
| 8 | 12 | 1659 | 282 | 83.0 | 132 |
| 16 | 30 | 2784 | 426 | 84.7 | 758 |
| 32 | 30 | 2527 | 465 | 81.6 | 426 |
| 0 | 1.88 | 321 | 50.1 | 84.4 | 1325 |

As is clear from Table 1, the amount of the substance which can be dewatered without addition of a coagulant is smaller than that of the substance which can be dewatered with addition of a coagulant. When rotating number of the rotary filter elements is increased for the purpose of increasing the amount of the feed substance without addition of a coagulant, the amount of solid particles which leaks into the filtrate also increases. The rotating number of the rotary filter elements can be increased and the amount of the substance which can be treated can also be increased in proportion as the amount of the coagulant added to the substance is increased.

Although the amount of coagulant added to the feed substance should be decided in due consideration of factors such as sludgy components in the feed substance and the size of filter elements, it is generally desirable to select the amount in the range of from 0.1 to 2.5% by weight on the basis of dry solids in the substance. This amount of coagulant is about half the amount of the same coagulant required when a cake having the same water content is obtained by use of a known centrifugal separator.

FIG. 6 represents another embodiment of the apparatus of the present invention for the dehydration treatment of a sludgy substance. The characteristic of this embodiment resides in permitting feeding of the substance without forced pressurizing means such as a pressure pump. The interior of the chamber of the apparatus, therefore, is substantially at atmospheric pressure while the substance is undergoing treatment inside the chamber. With reference to FIG. 6, the substance for treatment is forwarded by a fixed displacement pump 41 from the feed pipe 26 to a stirring tank 42, wherein it is stirred by the stirrer 28 with a coagulant delivered separately from a coagulant storage tank 29. The liquid which has overflowed a weir 43 of the stirring tank 42 is led through a trough 44 and then fed, via a conduit 45, into the chamber through an inlet 8 formed in the upper wall 2 of the chamber 1. This feeding of the substance to the chamber is effected by virtue of a spontaneous falling. The apparatus, thus, needs no forced pressurizing means for keeping the inside of the chamber pressurized. On arriving inside the chamber 1, the substance is caused to advance toward the front vertical wall 4 owing to the rotation of the filter elements of the upper filtration train 10a. Since in the present embodiment, the substance is not admitted through the bottom wall 3 of the chamber, the lower filtration train 10b has a length greater than that of the upper filtration train 10a so that the substance falling down from a passage "a" will be received more advantageously into a passage "c" between the two trains. In the bottom wall 3 of the chamber, there is disposed a draining conduit 46 adapted to drain water from inside the chamber to provide free access to the interior for the maintenance and inspection of the apparatus.

Since the present embodiment enables the substance to be fed to the chamber without forced pressurizing means, the chamber is not required to possess an airtight structure. Besides this advantage, the apparatus of this embodiment has a strong point not attained by the first embodiment. In the first embodiment, when the substance is fed into the passages "a" and "b" under pressure, the substance which has been dehydrated to a certain extent tends to stagnate inside the chamber and the treating capacity of the rotary filter elements to perform dehydration treatment therefore tends to be lowered to some extent. In the first embodiment of the apparatus, since the amount of the feed substance admitted through the inlets into the chamber for treatment is in proportion to the amount of the water component removed from the substance and drawn away through the orifices of the rotary filter elements, there is a possibility that, after the solids concentration of the substance increases to a certain extent owing to removal of the filtrate exuded from the substance under treatment in the passages "a" and "b" through the spaces of the rotary filter elements, those solid particles present in the gradually dehydrated substance will be crushed into finer particles by the rotation of the filter elements and the finer solid particles will leak into the filtrate owing to the pressure of delivery. If the amount of the feed substance admitted into the chamber for treatment is greatly decreased and the portion of the substance which has been dehydrated to some extent is consequently retained for a long time inside the passages "a" and "b", there is a possibility that the solid particles contained in the surface regions of the substance will be compacted by the action of the rotary filter elements and consequently the compacted solid particles will pass into the filtrate.

In the present embodiment illustrated in FIG. 6, however, since the substance admitted into the chamber for treatment is not pressed against the trains of rotary filter elements, there is scarcely a possibility that the solid particles of the substance will be crushed, forced into the spaces 16 and entrained by the filtrate. In the case of the present embodiment, the removal of the filtrate from the filtrate receptacles is effected not by forced extraction but by the force of gravity. By this method, the difference of pressure which occurs on the rotary filter elements can be decreased to a negligibly small magnitude. This feature coupled with the fact that the substance is admitted into the chamber without application of pressure leads to the creation of bulky advantageous conditions for the dewatering treatment.

Now, an experiment conducted with the apparatus according to this embodiment will be described hereinafter.

Circular plates of steinless steel 96 mm in diameter and 0.3 mm in thickness and annular spacers 64 mm in diameter and 0.4 mm in thickness were alternately arranged and fastened up to a total thickness of 150 mm to complete a filter element. Nine and ten such filter elements were so arranged respectively to complete an upper and a lower filtration trains. The circular plates of each filter element entered to a depth of 6 mm into the corresponding spaces intervening between the circular plates of the immediately adjacent filter element. The upper and the lower trains were vertically opposed to each other within the chamber across a passage communicating with an outlet, with the lower train displaced from the upper train by a fixed distance as illustrated in FIG. 6. These two trains were so positioned that their opposite surfaces were inclined toward each other by an angle of 2° toward the outlet and were separated from each other by the smallest distance of 11 mm at their outlet side end.

The filter elements in the trains were rotated at a rate of 100 r.p.hr. A feed substance prepared by mixing activated sludge having a solids concentration of 1.5% from a sewage treatment facility with a cationic polymeric coagulant of 1.2%, based on the dry solids content of the activated sludge was allowed to flow down through the inlet of the chamber of the apparatus under the force of gravity only.

The feeding of the substance to the chamber was effected with a device adapted to provide regulated delivery. The substance was fed to the chamber at varied feed rates so that cake would be produced containing dry solids of 15 kg, 10 kg, 5 kg and 2.5 kg per hour respectively.

For the purpose of comparison, the same substance was fed to the chamber under the pressure generated by a difference of head and the filtrate was also removed by forced suction by a pump and a difference of pressure was established between the chamber and the filtrate receptacle to facilitate the treatment. The results are shown in Table 2.

Table 2

| Weight of solid particles contained in cake (kg/hr) | Feeding of substance without application of pressure | | Feeding of substance under application of pressure | | |
|---|---|---|---|---|---|
| | Water content of cake (%) | Solid content in filtrate ppm | Water content of cake (%) | Solid content in filtrate (ppm) | Difference of pressure (m-H$_2$O) |
| 15 | 84.1 | less than 500 | 84.5 | 4500 | 4.0 |
| 10 | 81.5 | " | 82.0 | 3000 | 1.2 |
| 5 | 79.2 | " | 79.5 | 1500 | 0.7 |
| 2.5 | 77.5 | " | 81.5 | 4000 | 3.0 |

As is evident from the table given above, advantageous results are not always obtained by feeding the substance forcibly under application of pressure or removing the filtrate by forced suction. In some cases, better results are obtained by feeding the substance to the chamber at a fixed flow rate without the application of pressure.

As is evident from the foregoing detailed description, the present invention utilizes, for the dehydration of a sludgy substance, an apparatus which is formed by having a multiplicity of plates arranged at fixed intervals in the axial direction on a shaft to complete a rotary filter element, having a plurality of such rotary filter elements arranged in such a way that the plates of each rotary filter element partially enter the corresponding spaces intervening between the plates of the immediately adjacent rotary filter elements for thereby completing a filtration train, and having two such filtration trains opposed to each other across a passage of specific dimensions, and effects and the dehydration by causing the substance to pass in the passage formed between the opposite surfaces of the two filtration trains and allowing the filtrate from the substance to be exuded by means of the spaces and to be drawn away by means of the discharge orifices in the plates of each of the filter elements. The solid component of the sludgy substance can be effectively concentrated and the water component thereof can be effectively separated by properly selecting such factors as area or thickness of the plates, the distance between the spaced plates, the speed of rotation of the individual rotary filter elements and the distance between the opposite surfaces of the filtration trains in accordance with the particular type of the substance to be treated. Both the feeding of the substance for dewatering treatment and exudation and suction of the filtrate can be performed effectively without being specifically isolated from the atmosphere. The amount of coagulant to be added to the substance is small. Consequently, the present invention proves to be advantageous from the stand points of satisfactory performance of dehydration treatment, economy of the system and so on.

Obviously, many modifications and variations of the present invention are possible in light of the above teachings. It is therefore to be understood that within the scope of the appended claims, the invention may be practiced otherwise than as specifically described herein.

What is claimed is:

1. An apparatus for the dewatering of a sludgy substance, which comprises:
    a chamber provided with an outlet in the vertical side wall thereof for discharging the dewatered cake of the sludgy substance and in the upper wall thereof close to the outlet with an inlet for admitting the sludgy substance for dewatering;
    two filtration trains opposed to each other across an intervening passage which communicates with said outlet within said chamber, said filtration trans each consisting of a plurality of rotary filter elements which are each formed of a multiplicity of circular plates containing a plurality of filtrate discharging orifices arranged face to face in the axial direction at fixed intervals and which are so disposed that they intermesh to permit said circular plates of each said rotary filter element to enter the corresponding spaces between said circular plates of the adjacent rotary filter elements to a depth sufficient for the inserted edges of said circular plates to overlap at least the nearest ones of said filtrate discharging orifices in said circular plates of the adjacent rotary filter elements, said two trains being inclined to converge in the direction of said outlet and means to rotate said rotary filter elements furthest from said outlet at the highest angular speed and those nearer said outlet rotated at progressively lower angular speed;
    means for communicating said filtrate discharging orifices of each of said circular plates at one end of the rotary filter elements with the exterior of the chamber; and
    means for rotating said plurality of rotary filter elements so that said edges of the circular plates facing the intervening passage move toward the outlet;
    whereby said sludgy substance is conveyed toward said outlet, the liquid component thereof is removed to said exterior of said chamber via said filtrate discharging orifices, and said cake component thereof is discharged out of said outlet.

2. The apparatus according to claim 1, wherein the lower one of said filtration trains is longer than the upper one of said filtration trains by at least one filter element.

3. The apparatus according to claim 1, further comprising an additional inlet provided in the lower side of said chamber.

4. The apparatus according to claim 1, further comprising means for adding a coagulant to said substance being fed to the chamber through said inlet.

5. An apparatus for the dewatering of a sludgy substance, which comprises:
    a chamber provided with an outlet in the vertical side wall thereof for discharging the dewatered cake of the sludgy substance and in the upper wall thereof close to said outlet with an inlet for admitting said sludgy substance for dewatering, said sludgy substance being fed to said inlet of said chamber in an unpressurized state;
    means for adding a coagulant to said substance being fed to said inlet;
    two filtration trains opposed to each other across an intervening passage which communicates with said outlet within said chamber, said filtration trains each consisting of a plurality of rotary filter elements which are each formed of a multiplicity of circular plates containing a plurality of filtrate discharging orifices arranged face to face in the axial direction at fixed intervals and which are so disposed that they intermesh to permit said circular plates of each said rotary filter element to enter the corresponding spaces between said circular plates of the adjacent rotary filter elements to a depth sufficient for the inserted edges of said circular plates to overlap at least the nearest ones of said filtrate discharging orifices in said circular plates of the adjacent rotary filter elements, the lower one of said filtration trains being longer than the upper one of said filtration trains by at least one said rotary filter element, the two trains being inclined to converge in the direction of said outlet and means to rotate said rotary filter elements furthest from said outlet at the highest angular speed and those nearer said outlet rotated at progressively lower angular speeds;
    means for communicating said filtrate discharging orifices of each of said circular plates at one end of said rotary filter elements with the exterior of the chamber; and
    means for rotating said plurality of rotary filter elements so that the edges of the circular plates facing the intervening passage move toward said outlet;
    whereby said sludgy substance is conveyed toward said outlet, the liquid component thereof is removed to said exterior of said chamber via said filtrate discharging orifices, and the cake component thereof is discharged out of said outlet.

6. The apparatus according to claim 5, further comprising an additional inlet for admitting said feed of sludgy substance provided in the bottom wall of said chamber at a position close to said outlet.

7. A method for the dewatering of a sludgy substance by the use of an apparatus comprising a chamber provided with an outlet, two filtration trains opposed to each other across an intervening passage which communicates with said outlet, said filtration trains each consisting of a plurality of rotary filter elements which are each formed of a multiplicity of circular plates containing a plurality of filtrate discharging orifices arranged face to face in the axial direction at fixed intervals, said filtration trains intermeshing so that said circular plate of each rotary filter element enter the corresponding spaces between the circular plates of the adjacent rotary filter elements to a depth sufficient for the inserted edges of the circular plates to overlap at least the nearest ones of the filtrate discharging orifices in the circular plates of the adjacent rotary filter elements, said two trains being inclined to converge in the direction of said outlet and the rotary filter elements further from said outlet being rotated at the highest angular speed and those nearer the outlet being rotated at progressively lower angular speeds, said method including the steps of:

adding to said sludgy substance a coagulant in an amount ranging from 0.1 to 2.5% by weight based on the dry solids contained in said sludgy substance, feeding said sludgy substance having the coagulant added thereto to the intervening passage between said two filtration trains for thereby increasing the compression force exerted on the sludgy substance in proportion as said sludgy substance proceeds to said outlet;

removing the liquid component of said sludgy substance to the exterior of said chamber via said filtrate discharging orifices, and discharging out of said outlet the cake component of said sludgy substance.

8. The method according to claim 7, wherein said feed substance is fed to said chamber in an unpressurized state.

* * * * *